No. 12,403. REISSUED NOV. 7, 1905.
A. R. RAYMER.
METHOD OF CLEANING AND RESTORING BOILERS TO SERVICE CONDITION.
APPLICATION FILED JULY 15, 1905.
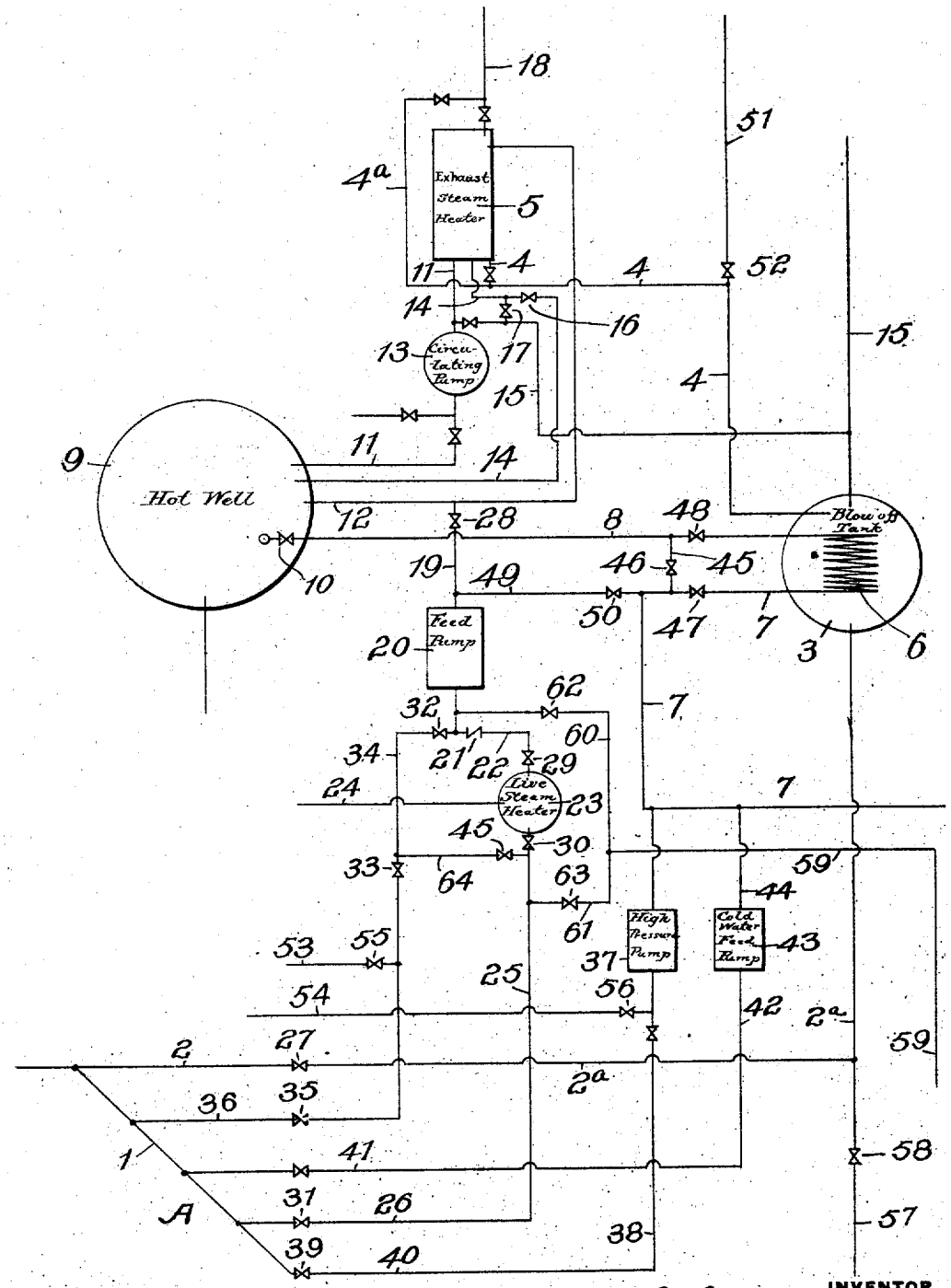
WITNESSES:
Herbert Bradley.
Francis Vernau.
INVENTOR
Albert R. Raymer
by Christy and Christy
Atty's

UNITED STATES PATENT OFFICE.

ALBERT R. RAYMER, OF BEAVER, PENNSYLVANIA.

METHOD OF CLEANING AND RESTORING BOILERS TO SERVICE CONDITION.

No. 12,403. Specification of Reissued Letters Patent. Reissued Nov. 7, 1905.

Original No. 757,839, dated April 19, 1904. Application for reissue filed July 15, 1905. Serial No. 269,892.

*To all whom it may concern:*

Be it known that I, ALBERT R. RAYMER, a citizen of the United States, residing at Beaver, in the county of Beaver and State of Pennsylvania, have invented or discovered certain new and useful Improvements in Methods of Cleaning and Restoring Boilers to Service Condition, of which improvements the following is a specification.

Most water for boilers of locomotives and stationary engines is used in its natural condition and contains materials which under a high temperature will be precipitated and form scale on the heating-surfaces, thus necessitating a frequent cleaning of the boiler. According to the present practice on railways the cleaning involves the following operations: First, the fire is drawn and the locomotive run into the roundhouse, the pressure in the boiler at this time being at about one hundred (100) pounds. The whistle or pop-valve, or both, are then opened to permit of the escape of steam. To reduce the pressure in the boiler from one hundred pounds (100) pounds, more or less, to zero in this manner usually requires from thirty to forty-five minutes. As soon as the pressure is reduced the blow-off cock is opened and the hot water allowed to escape into the sewer. A complete drainage of the water is effected by removing plugs in the water-legs forming the sides of the fire-box. When the boiler has been cooled to a working temperature, which is generally effected by the introduction of cold water through a hose connected to the boiler, wire brushes and scrapers are introduced through tapped holes to loosen the scale, thus permitting its being washed out. This draining, scraping, and washing out requires from three to four hours, and being completed the outlets are closed, the boiler filled with cold water, and the fire started, the draft being induced by compressed air or steam introduced into the stack by a vertically-arranged nozzle. As the fire-box and tubes are cold, the combustion of gases is so imperfect that large volumes of smoke are produced, so filling the roundhouse, rendering it nearly impossible for the workmen to remain in it. This blowing by air is maintained until sufficient steam is generated to permit the locomotive-blower to operate, which is kept in operation until service-pressure is generated. The generation of working pressure from cold water requires usually a little over an hour, and the total time required for all the operations from the time the fire is drawn until working pressure has been produced requires from five to six hours. The whole operation involves the waste of a large number of heat units in blowing off the steam and the drainage of the hot water into the sewer. It also subjects the boiler to excessive strains by unequal contracting caused by the introduction of cold water, and there is a large waste of fuel in the generation of working pressure, and also a loss of time in the service of the locomotive.

On some railroads and in some power plants the water is so treated that practically all foreign matter left in it will remain in solution under conditions of temperature and pressure existing in boilers in operation. While little or no scale will be formed on the heating-surfaces when using the treated water or water practically free from scale-forming ingredients, the percentage of foreign matter in solution in the water in the boiler will increase in a comparatively short time to such a point as to cause foaming. When this occurs, it is the present practice to draw the fire, run the locomotive to the roundhouse, blow off the steam, empty the boiler and refill it with cold water, and steam is then generated in the manner described. In short, the operation of cleaning the boiler when treated water is used is the same as with untreated water, except that the scraping of the tubes, &c., to loosen and remove the scale is not required.

The object of the invention described herein is to provide for the cleaning of the boiler and the restoration of service conditions without the loss of all the thermal units present in the boiler when the locomotive reaches the roundhouse, without subjecting the boiler to excessive strains, without a large waste of fuel and consequent inconvenience to the workmen, and without the long loss of time in service of locomotive incident to the present methods.

The accompanying drawing, forming a part of this specification, show diagrammatically the arrangement of the several parts or elements of my plant for the practice of my improved method.

In the practice of my invention the fire of the locomotive to be cleaned is banked or may be drawn and the boiler maintained at the desired temperature by a gas or sprayed-oil flame. It is the proposed practice to retain enough steam-pressure—*i. e.*, about one hundred (100) pounds—in the boiler to run the locomotive into its stall in the roundhouse.

When placed in its stall, the main pipe 1 of a manifold is connected by a flexible pipe to the blow-off cock, which is then opened, allowing the water and steam from the boiler to flow by the pipe 1 and branch or member 2 of the manifold into the tank 3, which will be termed the "blow-off tank." This tank is provided with an outlet-pipe 4, sufficiently large to prevent the generation of any material pressure therein, so that when water heated above 212° Fahrenheit from the boiler enters the tank there will be a rapid evolution of steam, which will continue until the water is cooled down to or approximately to 212° Fahrenheit. The steam thus evolved is conducted by the pipe 4 to a condenser 5, where the steam is employed to heat water to be fed to the boiler, as hereinafter described. A coil of pipe 6 is arranged within the blow-off tank and has one end connected by a pipe 7 to a suitable supply of water, which has by preference been treated to prevent the formation of insoluble precipitates in the boiler. The other end of this coil is connected by a pipe 8 to the hot-water tank 9, being provided inside of the tank with a float-valve 10, so as to prevent an overflow of water therefrom. This hot-water tank is connected by pipes 11 and 12 to the condenser 5, one of the pipes, as 11, being connected to the inlet of the condenser and the pipe 12 to the outlet end. A suitable pump 13, preferably of centrifugal type, is arranged in the line of the pipe 11 so as to draw water from the tank 9 and force it through the condenser 5 and back into the tank through the pipe 12. The water as it flows to the tank 9 is heated by the hot water in the blow-off tank 3 and by its circulation through the condenser 5 is raised to a still higher temperature by the steam arising from the blow-off tank, as above described, and caused to pass through the condenser. The water of condensation escapes from the condenser by a pipe 14, which has a valve 16 connected with the hot-well 9 and also by valve 17 with a pipe 15, leading to a sewer. By this arrangement, if the steam passing through the condenser is clean—*i. e.*, free from oil or other impurities—the valve 16 is opened and the water is discharged into the hot-well 9. If, however, the steam is impure, the valve 16 is closed and valve 17 opened, so that the water of condensation will flow by the pipe 15 into the sewer. The condenser 5 is provided with an outlet-pipe 18 for the escape of uncondensed steam, and a by-pass is provided in the pipe 4ª, extending from the pipe 4 around to the pipe 18, and having a suitable valve, so that when necessary or desired all or a part of the steam from the blow-off tank can be discharged into the atmosphere without passing through the condenser 5.

By the passage of the feed-water through the coil 6 and the circulation of water from the hot-well through the condenser 5 the water in the hot-well can be raised to approximately 205° Fahrenheit, this being done by the heat contained in the water discharged from the boilers to be cleaned. A pipe 19 is connected with the hot-well, preferably through the pipe 12, and forms the inlet or supply pipe for the feed-pump 20. This pump will receive hot water from the hot-well and force it through the pipes 21 and 22 into the live-steam heater 23, to which live steam is fed from any desirable source by the pipe 24. This live-steam heater is connected by a pipe 25 to the branch or member 26 of the manifold, and the latter is connected to the main pipe 1 of this manifold. After all the water in the boiler of the locomotive has been blown off, as described, the valve 27 in the pipe 2 is closed and the valves 28 in the pipe 19, 29 in the pipe 22, 30 in the pipe 25, and 31 in the pipe 26 are opened, so that by the operation of the pump 20 water is forced into the boiler through the connection previously established with the pipe 1. As the pump 20 is constructed to operate automatically as soon as pressure on the delivery side drops, as by opening the valve 31, the valves 28, 29, and 30 are usually kept open except when a different operation of the plant is desired. The water as it passes through the pump has approximately a temperature of about 205° Fahrenheit, more or less, but by its passage through the live-steam heater 23 is raised to a temperature of about 300° Fahrenheit, more or less, and at that temperature forced to the boiler under pressure sufficiently high to prevent evolution of steam until it enters the boiler.

It will be observed that as the emptying of the boiler and its immediate refilling with water at or approximately at the same temperature as that discharged is effected, one immediately after the other, no opportunity for any material cooling of the boiler has occurred, and that therefore the boiler will not be subject to any severe strains by this operation. As a matter of fact there remains in the boiler a pressure of about fifty pounds of steam when all the water has been discharged, and this pressure is retained without any material or undesirable diminution until the refilling occurs, which is preferably effected immediately subsequent to the last outflow of water. As soon as the boiler has been filled to the desired level the operation is stopped and the fire started or a new fire is kindled in the fire-box, and as the water has been discharged into the boiler at 300° Fahrenheit temperature, more or less, there will be sufficient steam to operate the steam-blower of the locomotive, and as the fire-box and tubes will be hot there will be a very little loss due to unconsumed gases.

It has been found by actual trial that the boiler of a locomotive can, counting from the time it enters the stall of the roundhouse to the time it leaves the same ready for service, be entirely emptied, refilled, and steam raised to a service-point in half an hour.

It will be observed that the feed-water is heated to or approximately to a temperature of 205° Fahrenheit by the water and steam taken from the boiler and that live steam is necessary to raise it to the 300° or any other temperature at which it is desired to fill the boiler.

My improvement further contemplates the charging of the boiler with warm water—*i. e.*, water from the hot-well—or with cold water, as may be desired. If when the boiler is emptied there is reason to believe there may be leaks and after repairs it is desired to test the boiler, valves 32 and 33 in pipe 34, extending from pipe 21, and also the valve 35 in the branch or member 36 of the manifold are opened, so that the water from the hot-well will be forced into the boiler without passing through the live-steam heater 33. Water is prevented from flowing from the live-steam heater during this operation by a check-valve 21 in the pipe 22. The boiler is filled completely with this hot water, all outlets being closed, and the valve 36 is closed. The high-pressure pump 37 is then started, drawing water from the supply-pipe 7 and forcing it through the pip e 38 past thevalve 39, which is opened, into the main pipe of the manifold and into the boiler. This pump is so constructed as to be capable of producing any desired pressure—say three hundred pounds—in the boiler. As the boiler is filled with hot water at the time of this test, and therefore approximating service condition, the testing of it at this time will be more effective to develop faults than if tested when cold.

In order that the hot-well 9 may be supplied with water without passing through the coil 6, the pipes 7 and 8 are connected by a pipe 45, having a valve 46. When the water is to be pumped directly into the hot-well, the valves 47 and 48 in the pipes 7 and 8 are closed and the valve 46 opened, thus forming a by-pass around the coil 6 to the hot-well. Provision is also made for taking the feed-water directly from its supply to the inlet-port of the pump 20 by connecting the pipes 7 to the pipe 19 by a branch 49, having a valve 50 therein. By closing the valves 28 and 47 and opening the valve 50 the pump 20 will draw cold water from the supply, force it through the live-steam heater, and thence directly into the boiler. The water thus flowing from the supply through the live-steam heater can be raised to the temperature desired for testing or to the maximum temperature required for charging the boiler for service.

When using treated water or water naturally free from scale-forming materials, it is usually sufficient to empty and refill the boiler in the manner described. When, however, water containing scale-forming material is used, the boiler is emptied, as described, and allowed to cool down sufficiently to permit of the scale being removed in the usual manner. After the closing of all openings in the boiler except the blow-off cock the valve 31 is opened to permit water at a temperature of about 300° Fahrenheit, more or less, to be pumped into the empty boiler. The water being free from pressure as it enters the boiler, a large volume of steam will be evolved, which will distribute itself throughout the boiler and effect a uniform heating of all parts. This uniform and equal heating will not cause any injury, as strains are produced only by unequal and irregular heating.

Provision is made for permitting the discharge of foul water from the blow-off tank after it has been cooled down by the water flowing through the coil 6. In practice it is considered desirable to empty the blow-off tank after each boiler has been cleaned, as otherwise a part of the heat of the incoming hot water and steam will be wasted in heating the water already in the tank. The tank and outlet are preferably so constructed and arranged that the tank will hold approximately the volume of water in the boiler at the time of cleaning.

Provision is made for utilizing steam in the condenser 5 from sources other than the water from the boiler being cleaned by connecting a pipe 51, provided with a valve 52, to the steam-pipe 4, the pipe 51 being also connected to a source of exhaust or live steam.

It will be understood that a manifold A is arranged adjacently to each stall of a roundhouse, and the branches or members 2, 26, 36, 40, and 41 of each manifold are connected, respectively, to main pipes 2[a], 25, 34, 38, and 42. As repair and erecting shops are usually arranged in the neighborhood of roundhouses, provision is made by pipes 53 and 54, having valves 55 and 56 and extending, respectively, from pipes 34 and 38, to charge boilers in the erecting or boiler shops with hot water and then apply a testing pressure thereto. In order to supply hot water for the boiler and erecting shops when the hot-well 9 is out of service, the pipes 25 and 34 are connected by a pipe 64, having a valve 45. By opening valve 50 and closing valves 32 and 28 cold water can be forced through heater 23 and thence by pipes 64 and 34 and 53 to the boiler and erecting shops, valves 45, 33, and 55 being opened, and by pipe 36 to the roundhouse, valves 35 being opened and valve 55 closed. By properly adjusting the steam-supply to the heater 23 the water can be heated to any desired temperature. Suitable connections are also made to the boilers of the erecting and boiler shops and the boilers of other adjacent power plants, whereby such boilers may be cleaned and recharged in the manner described and regularly fed with superheated hot and cold water, as described. To utilize the heat discharged from the stationary boilers in cleaning, the blow-off pipe $2^a$ is provided with a branch 57, having a valve 58, extending to the boiler to be cleaned. In order to recharge the boiler or to continuously feed the same, a pipe 59, extending from such boiler or boilers, is connected by pipes 60 and 61, having valves 62 and 63, respectively, with pipes 22 and 25. By closing the valve 62 and opening the valve 63 superheated water will be forced by pump 20 to the boiler or its feed-pump, while by closing valve 63 and opening valve 62 water from the hot-well 9 will be delivered to the boiler or its feed-pump.

I claim herein as my invention—

1. As an improvement in the art of cleaning and restoring boilers to service condition the method herein described, which consists in discharging substantially the entire liquid contents of a boiler, utilizing the discharge from the boiler for heating a fresh body of water without mingling the discharge and fresh water, and charging the boiler with water so heated, substantially as set forth.

2. As an improvement in the art of cleaning and restoring boilers to service condition, the method herein described, which consists in discharging substantially the entire liquid contents from the boiler, transferring the heat of the discharged contents to a fresh body of water, heated thereby without mixing such water and contents and feeding such heated water to the boiler, substantially as set forth.

3. As an improvement in the art of cleaning and restoring boilers to service condition, the method herein described, which consists in discharging substantially the entire liquid contents from the boiler, transferring the heat of the foul water to a fresh body of water, then further heating the fresh body of water above 212° Fahrenheit, and feeding such heated water to the boiler, substantially as set forth.

4. As an improvement in the art of cleaning and restoring boilers to service condition the method herein described, which consists in discharging substantially the entire liquid contents from the boiler while under pressure, recharging the boiler with fresh heated water and maintaining pressure in the boiler during and between such discharging and recharging, substantially as set forth.

5. As an improvement in the art of cleaning and restoring boilers to service condition the method herein described which consists in discharging substantially the entire liquid contents of a boiler, utilizing heat units of the discharge to heat a body of water without mingling the discharge from the boiler with the water to be heated, and charging such heated water into the boiler, substantially as set forth.

6. As an improvement in the art of cleaning and restoring boilers to service conditions the method herein described, which consists in discharging substantially the entire contents of a boiler, charging the boiler with fresh water heated by the discharge from the boiler without mingling the discharge with the fresh water, and maintaining the boiler at or approximately at a temperature of 212° Fahrenheit, substantially as set forth.

7. As an improvement in the art of cleaning and restoring boilers to service conditions the method herein described, which consists in discharging substantially the entire contents of a boiler, heating a fresh body of water by the discharge from the boiler without mingling the discharge with the fresh body of water, further heating the fresh body of water and feeding the same to a boiler, substantially as set forth.

8. As an improvement in the art of cleaning and restoring boilers to service conditions the method herein described, which consists in discharging substantially the entire contents of boilers, transferring the heat of the discharge to a fresh body of water without mingling the discharge with the fresh body of water and feeding the heated water to the discharged boilers, substantially as set forth.

In testimony whereof I affix my signature in presence of two witnesses.

ALBERT R. RAYMER.

Witnesses:
CHARLES BARNETT,
HERBERT BRADLEY.